United States Patent
Harter et al.

(10) Patent No.: US 9,646,351 B2
(45) Date of Patent: May 9, 2017

(54) ESTIMATION OF JURISDICTIONAL BOUNDARY CROSSINGS FOR FUEL TAX REPORTING

(71) Applicant: J. J. Keller & Associates, Inc., Neenah, WI (US)

(72) Inventors: Thomas C. Harter, Neenah, WI (US); Michael K. Kuphal, Greenville, WI (US); Bruce D. Lightner, La Jolla, CA (US)

(73) Assignee: J. J. Keller & Associates, Inc., Neenah, WI (US)

(*) Notice: Subject to any disclaimer, the term of this patent is extended or adjusted under 35 U.S.C. 154(b) by 0 days.

(21) Appl. No.: 14/851,252

(22) Filed: Sep. 11, 2015

(65) Prior Publication Data
US 2017/0076399 A1    Mar. 16, 2017

(51) Int. Cl.
| | | |
|---|---|---|
| *G08G 1/123* | (2006.01) | |
| *G06Q 40/00* | (2012.01) | |
| *G08B 21/00* | (2006.01) | |
| *G01R 11/56* | (2006.01) | |
| *G05D 1/02* | (2006.01) | |

(52) U.S. Cl.
CPC .......... *G06Q 40/123* (2013.12); *G08G 1/123* (2013.01)

(58) Field of Classification Search
CPC ............................ G06Q 40/123; G08G 1/123
USPC ................ 340/988, 686.1; 705/412; 701/300
See application file for complete search history.

(56) References Cited

U.S. PATENT DOCUMENTS

| | | |
|---|---|---|
| 5,359,528 A | 10/1994 | Haendel et al. |
| 5,694,322 A | 12/1997 | Westerlage et al. |
| 5,928,291 A | 7/1999 | Jenkins et al. |
| 5,970,481 A | 10/1999 | Westerlage et al. |
| 6,253,129 B1 | 6/2001 | Jenkins et al. |
| 6,571,168 B1 | 5/2003 | Murphy et al. |
| 6,614,394 B2 | 9/2003 | Honda et al. |
| 6,714,857 B2 | 3/2004 | Kapolka et al. |
| 7,072,746 B1 | 7/2006 | Burch |
| 7,117,075 B1 | 10/2006 | Larschan et al. |
| 7,881,838 B2 | 2/2011 | Larschan et al. |
| 7,996,150 B2 | 8/2011 | Nishida |
| 8,018,329 B2 | 9/2011 | Morgan et al. |
| 8,032,277 B2 | 10/2011 | Larschan et al. |
| 8,149,163 B2 | 4/2012 | Toda |

(Continued)

OTHER PUBLICATIONS

Federal ELD Regulations, published in the Federal Register, vol. 79, No. 60, Mar. 28, pp. 17655-17724 (2014).

(Continued)

*Primary Examiner* — Jack K Wang
(74) *Attorney, Agent, or Firm* — Michael Best & Friedrich LLP

(57) ABSTRACT

Systems and methods for the estimation of jurisdictional boundary crossings for fuel tax reporting relating to a commercial motor vehicle (CMV). One method includes defining a geo-fenced region for a jurisdiction. The location of the vehicle is determined using a positioning system and the geo-fenced region. When positioning system information is unavailable for a period of time, the location of the vehicle is estimated, including determining if a distance between two consecutive positioning system points is greater than a threshold value, and using predetermined route information to estimate where the vehicle has crossed the geo-fenced region boundary.

31 Claims, 6 Drawing Sheets

(56) References Cited

U.S. PATENT DOCUMENTS

| | | | |
|---|---|---|---|
| 8,284,069 B2* | 10/2012 | Sverrisson | G08G 1/207 340/686.1 |
| 8,442,508 B2 | 5/2013 | Harter et al. | |
| 8,620,515 B2 | 12/2013 | Kwak | |
| 8,626,568 B2 | 1/2014 | Warkentin et al. | |
| 8,805,418 B2 | 8/2014 | Nichols | |
| 8,909,248 B2 | 12/2014 | Phillips et al. | |
| 2003/0163249 A1* | 8/2003 | Kapolka | G08G 1/20 701/123 |
| 2004/0243285 A1 | 12/2004 | Gounder | |
| 2005/0060070 A1 | 3/2005 | Kapolka et al. | |
| 2007/0050108 A1 | 3/2007 | Larschan et al. | |
| 2007/0067228 A1 | 3/2007 | Furman | |
| 2007/0129878 A1* | 6/2007 | Pepper | B60W 40/12 701/123 |
| 2007/0177605 A1 | 8/2007 | Benco et al. | |
| 2009/0006107 A1* | 1/2009 | Golden | G01F 1/667 705/7.36 |
| 2010/0061190 A1 | 3/2010 | Nelson | |
| 2011/0218896 A1 | 9/2011 | Tonnon et al. | |
| 2012/0303256 A1* | 11/2012 | Morgan | G06Q 10/08 701/300 |
| 2013/0006519 A1 | 1/2013 | Doherty et al. | |
| 2013/0031029 A1* | 1/2013 | Davidson | G07B 15/06 705/412 |
| 2013/0054135 A1 | 2/2013 | Backsen, Jr. | |
| 2013/0226397 A1 | 8/2013 | Kuphal et al. | |
| 2013/0302758 A1 | 11/2013 | Wright | |
| 2015/0112542 A1* | 4/2015 | Fuglewicz | G07C 5/0858 701/32.2 |

OTHER PUBLICATIONS

Comments by Eclipse Software Systems to Proposed Federal ELD Regulations, published at http://www.regulations.gov under docket No. FMCSA-2010-0167 at least as early as Jul. 29, 2015.

Comments by Inthinc Technology Solutions to Proposed Federal ELD Regulations, published at http://www.regulations.gov under docket No. FMCSA-2010-0167, Jun. 25, 2014.

Comments by Omnitracs, LLC to Proposed Federal ELD Regulations, published at http://www.regulations.gov under docket No. FMCSA-2010-0167 at least as early as Jul. 29, 2015.

Comments by Zonar Connected to Proposed Federal ELD Regulations, published at http://www.regulations.gov under docket No. FMCSA-2010-0167 at least as early as Jul. 29, 2016.

Comments by XRS Corporation to Proposed Federal ELD Regulations, published at http://www.regulations.gov under docket No. FMCSA-2010-0167 at least as early as Jul. 29, 2017.

Comments by Saucon Technologies to Proposed Federal ELD Regulations, published at http://www.regulations.gov under docket No. FMCSA-2010-0167, Jun. 12, 2014.

* cited by examiner

ESTIMATION OF JURISDICTIONAL BOUNDARY CROSSINGS FOR FUEL TAX REPORTING

BACKGROUND

Embodiments of the invention relate to systems and methods for the estimation of jurisdictional boundary crossings for fuel tax reporting.

Operators of commercial motor vehicles ("CMV's") are required to meet certain specific performance standards and regulations for operating such vehicles. For example, some operators of the CMV's are required to meet hours-of-service regulations. Also, many states require fuel taxes be paid based upon mileage driven by CMV's within their jurisdictions.

SUMMARY

One embodiment of the invention provides a method of estimating a jurisdictional boundary crossing for fuel tax reporting relating to a commercial motor vehicle (CMV). The method includes defining a geo-fenced region for a jurisdiction, the geo-fenced region having at least one boundary. The method also includes determining, using a positioning system and the geo-fenced region, a location of the vehicle and estimating a location of the vehicle when positioning system information is unavailable for a period of time, including determining if a distance between two consecutive positioning system points is greater than a threshold value, and using predetermined route information to estimate where the vehicle has crossed the geo-fenced region boundary. Additionally, the method includes storing vehicle location data on a base unit until the base unit is coupled to a portable device.

Another embodiment of the invention provides a system configured to determine state fuel tax reporting relating to a CMV. The system includes a base unit installed on the vehicle, a portable device, at least one processor, and at least one physical computer storage medium comprising stored executable instructions that when executed by the at least one processor cause the at least one processor to perform operations to estimating a jurisdictional boundary crossing. The operations include defining a geo-fenced region for a jurisdiction, the geo-fenced region having at least one boundary. The operations also include determining, using a positioning system and the geo-fenced region, a location of the vehicle, and estimating a location of the vehicle when positioning system information is unavailable for a period of time, including determining if a distance between two consecutive positioning system points is greater than a threshold value and using predetermined route information to estimate where the vehicle has crossed the geo-fenced region boundary. Additionally, the operations include storing vehicle location data on the base unit until the base unit is coupled to a portable device.

In another aspect, the invention includes at least one physical computer storage medium including stored instructions. The stored instructions, when executed, determine state fuel tax reporting relating to a CMV. The at least one physical storage medium includes instructions which, when executed by a processor, perform operations. Those operations include defining a geo-fenced region for a jurisdiction, the geo-fenced region having at least one boundary. The operations also include determining, using a positioning system and the geo-fenced region, a location of the vehicle and estimating a location of the vehicle when positioning system information is unavailable for a period of time, including determining if a distance between two consecutive positioning system points is greater than a threshold value and using predetermined route information to estimate where the vehicle has crossed the geo-fenced region boundary. Additionally, the operations include storing vehicle location data on a base unit until the base unit is coupled to a portable device.

In each of the embodiments, distributed processing divides certain tasks between a base unit and a portable device. In one embodiment, the base unit stores geo-fenced region boundaries and generates vehicle location information at specified intervals and when a geo-fenced region boundary is crossed. The portable device reads the vehicle location information and sends it to a fuel tax computing program.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being carried out in various ways.

In one particular embodiment, the invention provides a system for logging performance of a driver operating a vehicle having a vehicle information system from which at least one vehicle operating parameter may be obtained in a performance monitoring process. The vehicle operating parameters collected through the vehicle information system and information such as operator identity from a portable device are wirelessly communicated to a remote host through a network such as the Internet.

Figure 1:
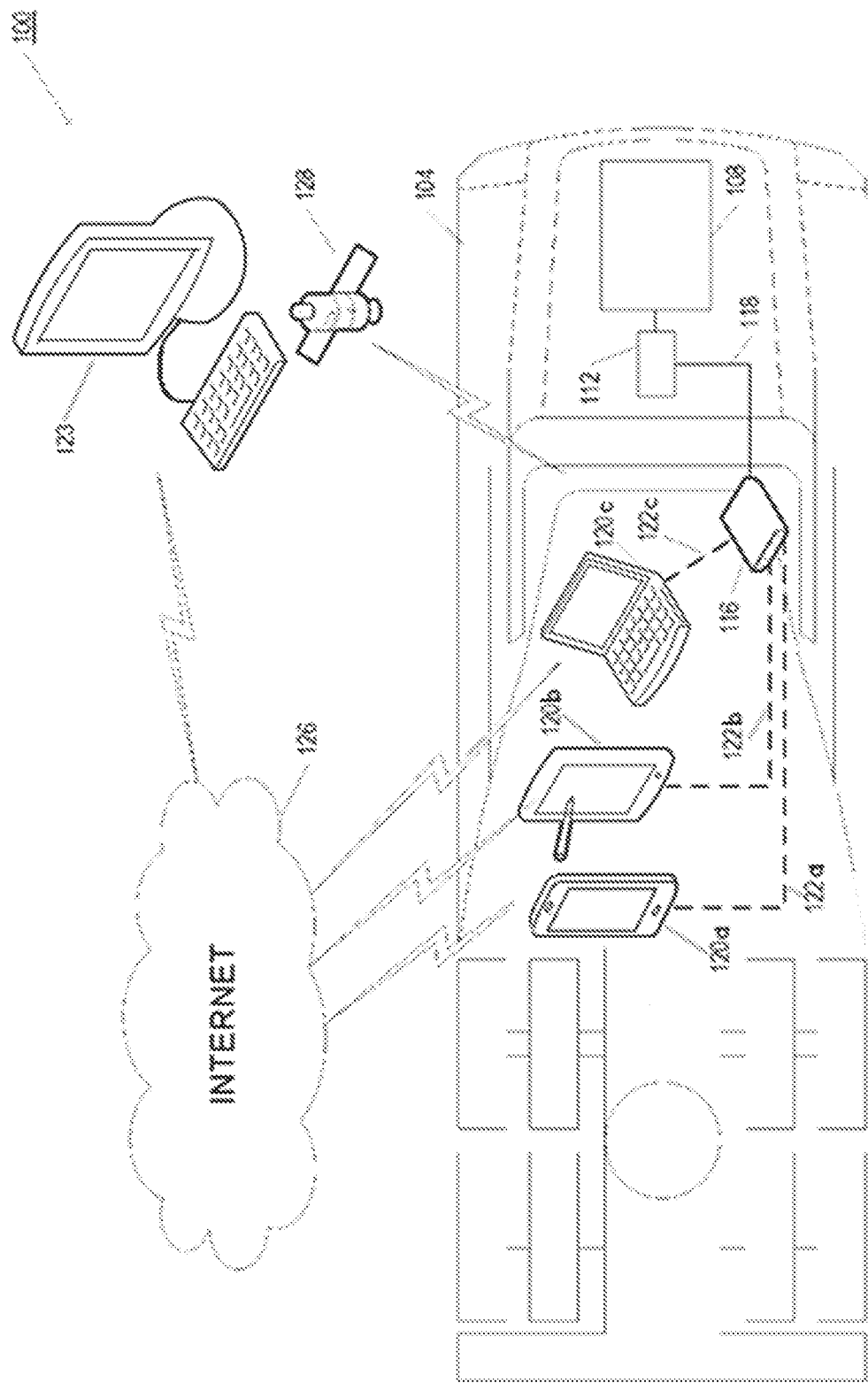
FIG. 1 is a schematic illustration of a system structured in accordance with an embodiment of the invention.

FIG. 1 shows a performance monitoring system 100 for use with a commercial motor vehicle ("CMV") 104. Although the CMV 104 illustrated is a tractor configured to tow a trailer (not shown), the performance monitoring system 100 can also be implemented in other types of CMV's such as construction vehicles and agricultural equipment. The CMV 104 includes an engine 108 that drives the CMV 104, and is controlled by an electronic control unit ("ECU") 112 that determines operating information or parameters from the engine 108, and other parts of the CMV 104. Operating parameters monitored by the ECU 112 include speed, hours of service, operating status, ignition switch status, trip distance, total vehicle distance, and the like.

The performance monitoring system 100 also includes an electronic on-board recorder ("EOBR") base unit 116 that communicates with the ECU 112 through an information bus 118 conforming to standards such as SAE J1939 and SAE J1708 network buses. The base unit 116 has a plurality of functions including, but not limited to, time keeping and data logging. In one implementation, the base unit 116 records and stores CMV information or data from the ECU 112 that is necessary to comply with International Fuel Tax Agreement regulations. The base unit 116 stores vehicle location data which includes positioning system information, estimated position information, jurisdiction identifiers, odometer data, and fuel consumption data. The performance monitoring system 100 also includes a portable device such as a mobile phone 120a, a tablet 120b, a laptop computer 120c, or the like, that communicates with the base unit 116. The portable device may be an Android, Apple iOS, Microsoft Windows or similar based device. In one embodiment, the portable device includes an application for logging purposes. The application processes and stores data from the base unit 116 retrieved from the information bus 118. The application allows for manual entries made by the driver. The application also generates Hours of Service (HOS) compliance data, vehicle performance data, and driver performance data. This data includes driving time and driving distance. The base unit 116 communicates with the portable device through a cable or wireless link 122a, 122b, 122c. The link 122a, 122b, 122c may be a serial cable, such as a USB cable. Other exemplary links include a wireless personal-area-network such as Bluetooth, Wi-Fi, Near Field Communication, and the like. The portable device generally supports multiple platforms such as smart phones 120a, tablets 120b, and computers such as laptops 120c.

The performance monitoring system 100 includes a remote server 123 running a remote application, such as a fuel tax computing program, that wirelessly communicates with the portable device via a network such as the Internet, detailed hereinafter. An application on the portable device may send data to the remote server 123 for viewing, reporting, and analyzing. A global position satellite ("GPS") system or other position determination system 128 also communicates with the ECU 112 and/or the base unit 116 so that information from the GPS system 128 (such as time and location) is available to the CMV 104. In some embodiments, at least a portion of the information stored in the base unit 116 or information communicated to and from the base unit 116 is encrypted.

Figure 6:
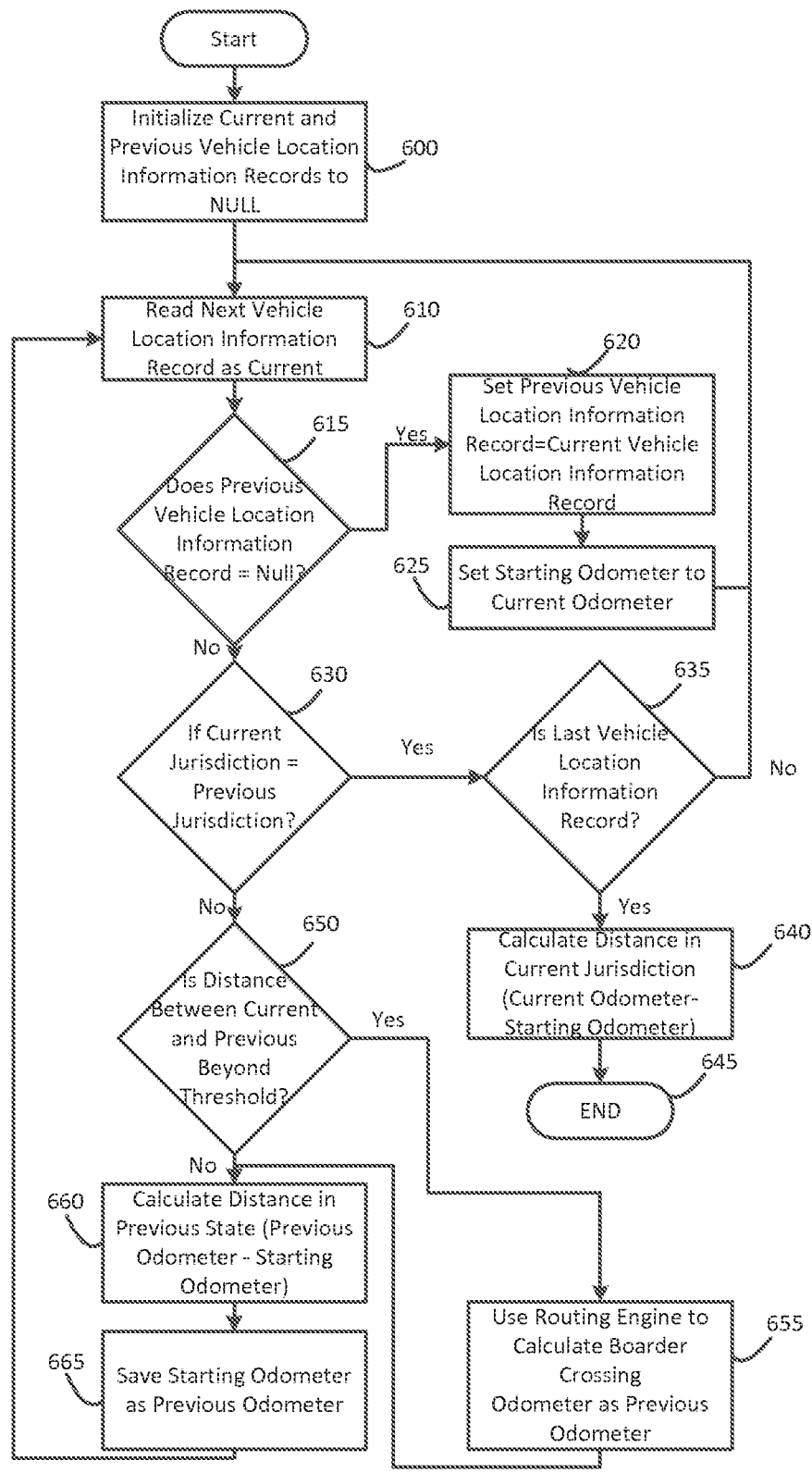
FIG. 6 is a flow chart of a fuel tax mileage calculating program.

Processing is distributed or shared between the base unit 116 and the portable device. The base unit 116 stores geo-fenced region boundaries and generates vehicle location information on specified intervals and when a geo-fenced region boundary is crossed. The portable device reads the vehicle location information and sends it to a fuel tax computing program whose flow chart is shown in FIG. 6. The program may be stored on a remote host 123.

Figure 2:
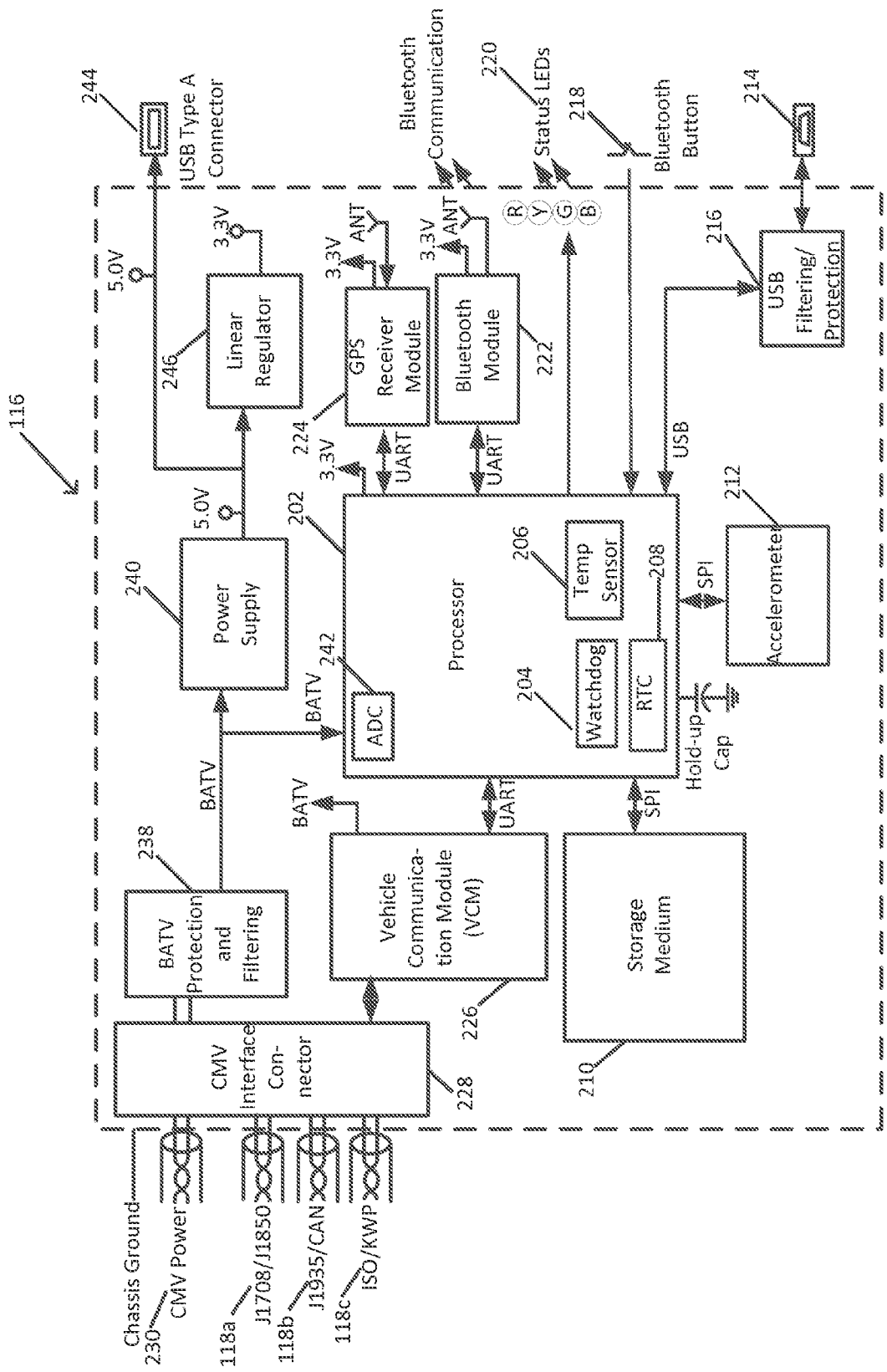
FIG. 2 illustrates a base unit of the system in FIG. 1 in a block diagram format.

FIG. 2 shows the base unit 116 in a block diagram format. The base unit is a low-power, custom designed telematics device that incorporates a processor 202. In another embodiment, the base unit 116 is a telematics device which gathers vehicle data from the on-board diagnostic (OBD) connecter and includes a GPS receiver.

As shown, the base unit 116 includes a processor (such as a microprocessor, controller or application-specific-integrated-circuit ("ASIC")) 202. The processor 202 preferably includes a custom programmed STM32ARM Cortex M3 microcontroller with 768 Kbytes of program flash memory and 96 Kbytes of static RAM memory, running a free license Real Time Operating System such as FreeRTOS. The processor includes a watchdog 204, temp sensor 206, and real-time clock (RTC) 208, which provides a real-time clock function to allow software to accurately determine a time with a predetermined resolution. In some embodiments, the RTC 208 is required to remain operational while the CMV 104 (FIG. 1) does not provide power to the base unit 116.

The processor 202 is coupled to a storage medium 210. The storage medium 210 is physical, non-transient storage device. The storage medium 210 is preferably a non-volatile 32 megabyte flash memory device, but could also be any type of non-volatile flash memory including a NAND or NOR interface or a serial or parallel interface. In addition, the storage medium 210 may be a combination of RAM, ROM, EEPROM, CD-ROM, magnetic disk storage, other magnetic storage devices, or any other medium that could be used to store computer executable instructions or data structures.

The processor 202 is coupled to an accelerometer 212. The base unit 116 also includes a USB micro AB connector 214 to transmit and receive data through a USB connector of an external portable device. The received data is filtered and protected with a USB protection and filtering module 216 before going to the processor 202. The processor 202 is coupled to a Bluetooth button 218. Additionally, the processor 202 displays the status of the base unit 116 with a plurality of status light-emitting-diodes 220 that are red (R), yellow (Y), blue (B), and green (G).

To communicate with the portable device, the base unit 116 includes a Bluetooth Module 222 configured to be connected to the processor. To receive a GPS signal from the GPS system 128 (FIG. 1), the base unit 116 includes a GPS receiver module configured to be connected to the processor.

The processor 202 is coupled to a vehicle communication module (VCM) 226. The VCM 226 preferably has 64 Kbytes of programmed flash memory and 20 KB of static RAM memory. This VCM 226 is coupled to a CMV 228 interface connector that connects to the CMV power bus 230. Bus 230 provides communication between the ECU 112 (FIG. 1) and the SAE J1708/SAE J1850 network bus 118a, the SAE J1939/CAN network bus 118b, and the ISO/KWP bus 118b. KWP is a Keyword Protocol promulgated by the International Organization for Standardization.

In the embodiment shown, the base unit 116 (FIG. 1) receives its power from the CMV 104 (FIG. 1) through the CMV interface connector 228 and a CMV power bus 230. The power is regulated and surge-protected with a Battery Voltage (BATV) protection and filtering system 238, and a power supply circuit 240 that is preferably a 5.0 V switch mode power supply. This power supply and voltage protection and filtering system 238 are coupled to the processor 202, where the signals are converted with the Analog-to-Digital Converter (ADC) 242. The power supply 240 is also connected to USB type A connector 244 and a linear regulator 246. Preferably, the linear regulator is a 3.3V low-dropout (LDO) linear regulator.

Figure 3:
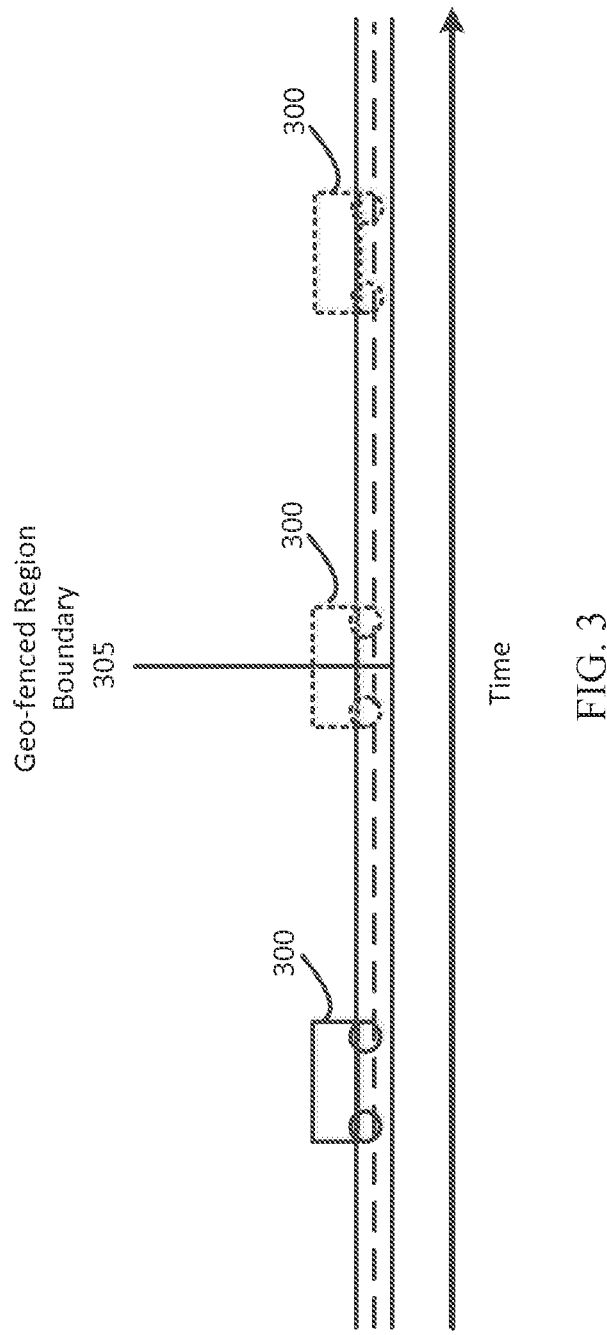
FIG. 3 shows a vehicle traveling and crossing a geo-fenced region boundary.

FIG. 3 shows a vehicle 300 traveling and crossing a geo-fenced region boundary 305. As the vehicle 300 travels, the positioning system 128 (FIG. 1) sends positioning system information, which corresponds to the locations of the vehicle 300 at specific times, to the base unit 116 (FIG. 1). The base unit 116 (FIG. 1) also monitors and records vehicle operating parameters, such as odometer data and fuel consumed. The base unit 116 (FIG. 1) creates vehicle location data records at specified intervals of time, preferably 15 seconds, which may include positioning system information, estimated position information, jurisdiction identifiers, odometer data, and fuel consumption data. The vehicle location data records are sent to the portable device at specified intervals of time, preferably 15 minute intervals. If the vehicle 300 is traveling and crosses a geo-fenced region boundary 305 that is stored on the base unit 116 (FIG. 1), then the base unit 116 (FIG. 1) creates an event. With this event, the vehicle location data, is updated to include the new jurisdiction identifier and stored as a record. The generated event identifies both the previous location of the vehicle and the current location of the vehicle from the positioning system information, each with an associated jurisdiction.

The vehicle location data is stored on the base unit 116 (FIG. 1) until it is coupled to the portable device. The portable device reads the vehicle location data at specified intervals of time, preferably at 15 minute intervals. If the vehicle 300 crosses a geo-fenced region boundary 305, then the base unit sends the vehicle location data to the portable device at the border crossing event if the base unit 116 (FIG. 1) and portable device are coupled, in addition to sending on the data at the specified intervals of time, preferably at 15 minute intervals. The portable device sends this vehicle location data to a fuel tax computing program whose flow chart is shown in FIG. 6. The fuel tax computing program reads the vehicle location data and accumulates the distance, identified by the difference in odometers data, for each jurisdiction identified with the positioning system information in order to compute the respective fuel tax for each taxing jurisdiction.

The base unit 116 (FIG. 1) may not receive any valid positioning system information even though the vehicle is moving. If the time with no valid positioning system information exceeds a predetermined threshold period of time, preferably 15 seconds and then the base unit 116 (FIG. 1) once again receives valid positioning system information, then the base unit 116 (FIG. 1) determines if a geo-fenced region boundary was crossed in the period of time that the base unit was not receiving valid positioning system information. If a geo-fenced region boundary was crossed, meaning the vehicle 300 is located in a different jurisdiction than it was located before positioning system information was unavailable, then the location of the vehicle 300 when it crossed the geo-fenced region boundary must be estimated. The estimation determines if a distance between two consecutive positioning system points is greater than a threshold value. The two consecutive points are the last valid positioning system vehicle location before the base unit 116 (FIG. 1) stopped receiving positioning system information and the first valid positioning system vehicle location after a period of time when the base unit did not receive valid positioning system vehicle location information. If the distance, determined using the odometer data, is less than the threshold, then the next positioning in the new jurisdiction is considered to be the estimated jurisdiction crossing point. If this distance is greater than a threshold, then the distance is significant enough to need an estimation of the geo-fenced region boundary crossing. In that case, predetermined route information also is used to estimate where the vehicle crossed the geo-fenced region boundary. The base unit 116 (FIG. 1) creates an event for the geo-fenced region crossing. With this event, the vehicle location data is updated to include the new jurisdiction identifier. The generated event identifies both the previous location of the vehicle and the current location of the vehicle from positioning system information and each location of the vehicle is stored on the base unit 116 (FIG. 1) with a jurisdiction identifier.

The vehicle location data is stored on the base unit 116 (FIG. 1) until the base unit is coupled to the portable device. The portable device reads the vehicle location data at specified intervals of time, preferably at 15 minute intervals. If the vehicle 300 crosses a geo-fenced region boundary 305, then the base unit sends the vehicle location data to the portable device at that event if the base unit 116 (FIG. 1) and portable device are coupled, in addition to sending on the specified intervals of time, preferably 15 minute intervals. The portable device sends this vehicle location data to a fuel tax computing program whose flow chart is shown in FIG. 6. In order to compute the fuel tax, the fuel tax computing program reads the vehicle location data and accumulates the distance, identified by the difference in odometer data, for each jurisdiction identified with the positioning system information.

Figure 4:
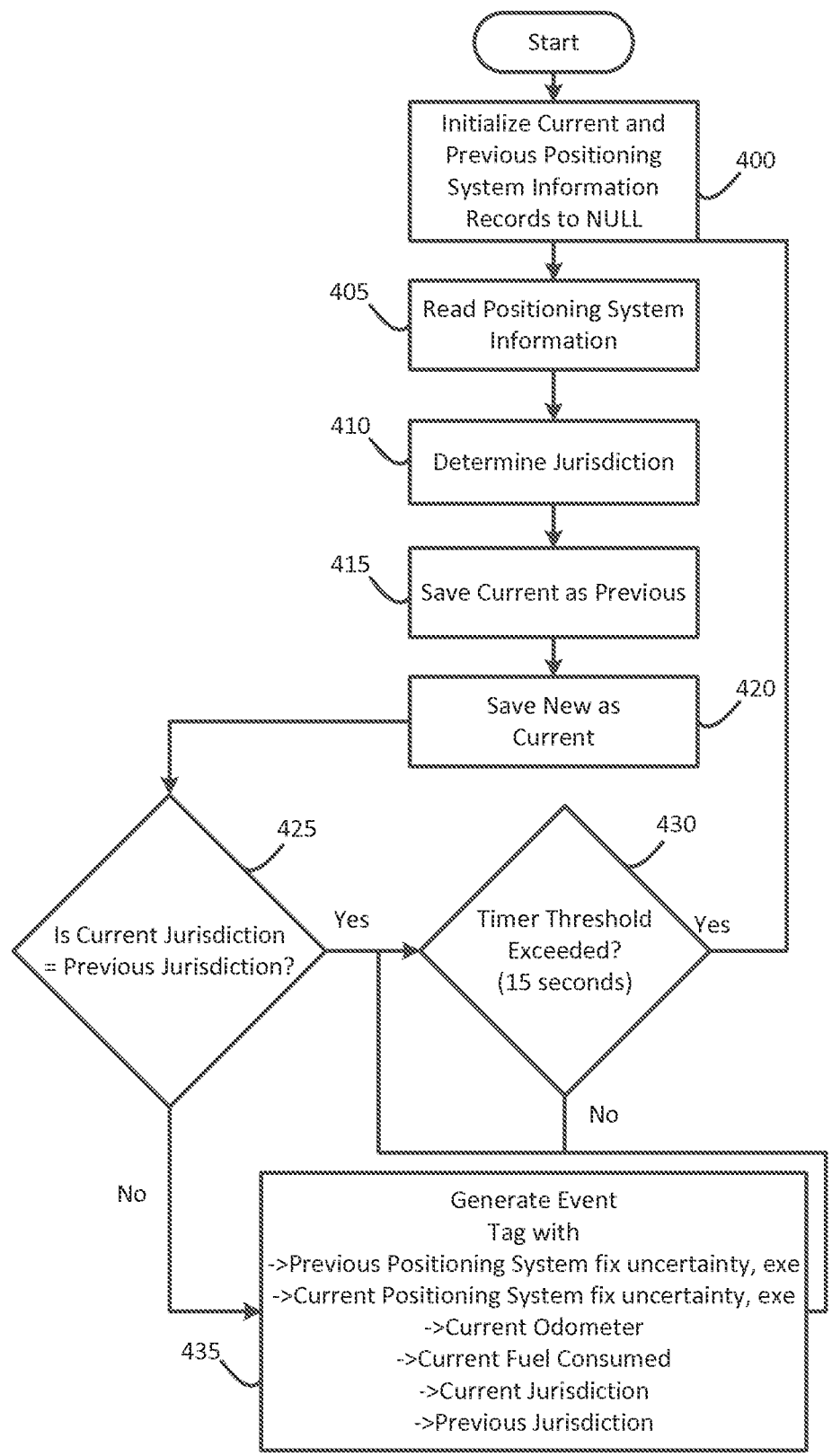
FIG. 4 is a geo-fenced region boundary crossing state machine diagram.

FIG. 4 is a diagram or flow chart of a geo-fenced region boundary crossing state machine. The processing of this state machine takes place in the base unit 116 (FIG. 1). The process begins at step 400 where the processor 202 (FIG. 2) initializes the current and previous positioning system information records to NULL. This is done when a trip begins, to clear records from a previous trip. Each day is considered a single trip. After initializing, the base unit 116 (FIG. 1) reads the positioning system information of the vehicle 300 (FIG. 3) as received from the positioning system 128 (FIG. 1) at step 405. After reading the positioning system information, the processor 202 (FIG. 2) determines at step 410 in which jurisdiction the vehicle 300 (FIG. 3) is located, based on the geo-fenced region boundaries stored in the base unit 116 (FIG. 1) for each jurisdiction. Once the jurisdiction is determined, the current positioning system information record is saved as the previous positioning system information record. The current positioning system information record starts as NULL at the beginning of a trip. Therefore at step 415, the previous positioning system information record will be set to NULL the first time this process runs at the start of a trip. At step 420 the current positioning system information record is set to the positioning system information read at step 405.

The process continues at step 425 where the processor 202 (FIG. 2) determines whether the current jurisdiction is equal to the previous jurisdiction. At this step, the processor 202 (FIG. 2) is determining whether a geo-fenced region boundary for a jurisdiction has been crossed. If the vehicle 300 (FIG. 3) is located in the same jurisdiction as the previous jurisdiction, then no geo-fenced region boundary for a jurisdiction has been crossed, and the process continues to step 430, where the processor 202 (FIG. 2) determines whether the timer threshold has been exceeded. The timer threshold is a predetermined value for the rate at which the base unit receives positioning system data, preferably 15 seconds. If the timer threshold has not been exceeded, then the process continues to loop through this step until the timer threshold is exceeded. Once the timer threshold is exceeded, the vehicle location information is sent to the portable device and then the process loops to step 405, where the processor 202 (FIG. 2) reads the positioning system information of the vehicle.

If the current jurisdiction is not the same as the previous jurisdiction, as determined in step 425, then the vehicle 300 (FIG. 3) must have crossed a geo-fenced region boundary for a jurisdiction. At step 435, the processor 202 (FIG. 2) generates an event with vehicle location data or tags which includes the previous positioning system fix uncertainty, the current positioning system fix uncertainty, the current odometer reading, the current fuel consumed, the current jurisdiction and the previous jurisdiction. The previous positioning system fix uncertainty and current positioning system fix uncertainty identify the distance traveled since the last valid location was obtained. All of this information is stored in the base unit 116 (FIG. 1) until the base unit is coupled to a portable device. The portable device sends this information to the fuel tax computing program. Once the event is generated at step 435, the processor determines whether the timer threshold, preferably 15 seconds was exceeded and loops until the timer threshold has been exceeded. Once the timer threshold has been exceeded, the process loops to step 405 where the processor 202 (FIG. 2) reads the positioning system information of the vehicle.

If positioning system information is unavailable for a period of time, preferably over 15 minutes, this process waits at step 405, until valid positioning system information is available.

Figure 5:
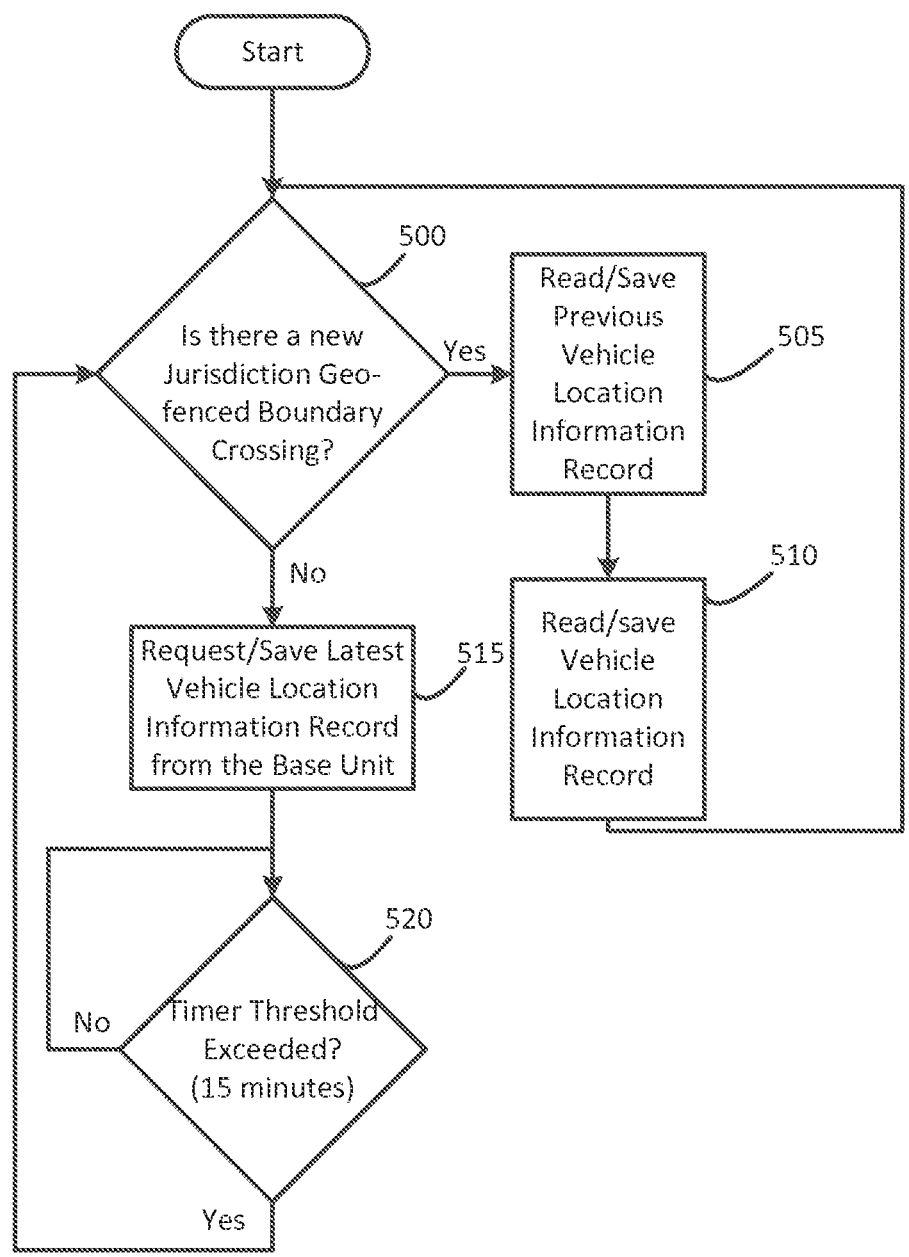
FIG. 5 is the positioning system retrieval state machine diagram.

FIG. 5 is a diagram of the vehicle location data retrieval state machine. These steps take place on the portable device. At step 500, the portable device determines if there is a new jurisdiction geo-fenced region boundary crossing, meaning the vehicle 300 (FIG. 3) is in a different jurisdiction, according to the current positioning system information, than the jurisdiction in which it was located when the next previous positioning system information was acquired. This is determined by the receipt of an event data from the base unit 116 (FIG. 1). If the vehicle 300 (FIG. 3) has crossed a geo-fenced boundary into a new jurisdiction, then the previous vehicle location information record is read by the portable device from the base unit 116 (FIG. 1) and recorded on the portable device at step 505. At step 510, the current vehicle information record is read on the portable device from the base unit 116 (FIG. 1) and recorded on the portable device. The process loops back to step 500, where the system continues to check if there is a new jurisdiction geo-fenced boundary crossing based on event information received from the base unit 116 (FIG. 1).

If there is no new jurisdiction geo-fenced boundary crossing, as determined in step 500, the process continues to step 515, where the portable device requests and saves the latest vehicle location information record from the base unit 116 (FIG. 1). The process continues at step 520, where the time elapsed since determining if a new jurisdiction geo-fenced boundary was crossed is compared to a timer threshold, preferably 15 minutes. If the timer threshold is not exceeded, the process continues to loop to step 520 until the timer threshold is exceeded. When the timer threshold is exceeded, the process loops back to step 500 to determine if the vehicle 300 (FIG. 3) has crossed a new jurisdiction geo-fenced boundary based on event data received from the base unit 116 (FIG. 1).

FIG. 6 is a fuel tax mileage calculating program. The process begins at step 600 where the program initializes the current and previous vehicle location information records to NULL. This is done when a trip begins, to clear records from a previous trip. After initialization, the program reads the vehicle location information record as received from the portable device. This vehicle location information record is read as the current record. At step 615, the program determines if the pervious vehicle location information record is NULL. If it is NULL, that means that this is the first vehicle location information record of the trip, and the process moves to step 620 where the previous vehicle location information record is set to the current vehicle location information record. The starting odometer is set to the current odometer at step 625. The process then loops back to step 610 where the next vehicle location information record is read as the current information.

If the previous vehicle location information record is not NULL as determined at step 615, then the program determines if the current jurisdiction is the same as the previous jurisdiction based on the vehicle location information records. If the jurisdiction is the same, the vehicle 300 (FIG. 3) did not cross a geo-fenced region jurisdictional boundary. At step 635, the program determines if the record is the last vehicle location information record, meaning the trip has ended. If the record is not the last vehicle location information record, the process loops back to step 610, where the program reads the next vehicle location information record as current. If the record is the last vehicle location information record as determined at step 635 then the program calculates the distance traveled in the current jurisdiction at step 640. The distance is calculated by subtracting the starting odometer reading from the current odometer reading. The process ends at step 645.

If the current jurisdiction is not the previous jurisdiction as determined at step 630, then the program determines if the distance between the current vehicle location (from the current vehicle location information record) and the previous vehicle location (from the previous vehicle location information record) is greater than a predetermined threshold, preferably 15 miles, at step 650. If the distance is not greater than the threshold, then the program calculates the distance traveled in the previous jurisdiction by subtracting the starting odometer value from the previous odometer value at step 660. Then the program saves the starting odometer value as the previous odometer value at step 665, and the process loops back to step 610 where the program reads the next vehicle location information record as current.

If the distance between the current vehicle location and the previous vehicle location is greater than a predetermined threshold, preferably 15 miles, at step 650, then the process moves to step 655. At step 655, the routing engine calculates the geo-fenced boundary crossing and the current odometer is set as the previous odometer. The routing engine may be a web service provided by ALK Technologies located in Princeton, N.J., or an application named IntlelliRoute supplied by Rand McNally located in Skokie, Ill. At step 660, the program calculates the distance in the previous state or jurisdiction by subtracting the starting odometer value from the previous odometer value at step 660. Then the program saves the starting odometer value as the previous odometer value at step 665 and the process loops back to step 610 where the program reads the next vehicle location information record as the current record.

In one embodiment, fuel consumption and fuel tax are determined from the mileage, from the distance calculation at step 660 and 640, and from fuel purchases. Records of fuel purchases can be entered and stored on the portable device, or entered into the fuel tax computing program. In another embodiment, fuel purchases are tracked using a fuel card, and the fuel tax computing program imports the fuel purchases from a file generated by the fuel card vendor.

In another embodiment, fuel consumption is calculated directly by the base unit 116 (FIG. 1). The base unit 116 (FIG. 1) processes data from the vehicle bus 118 (FIG. 1) from the engine 108 (FIG. 1) to calculate fuel consumption directly from the vehicle 300 (FIG. 3). In one embodiment, fuel can be estimated from a mass air-flow sensor (MAF). The gasoline air to fuel ratio of the vehicle 300 (FIG. 3) is maintained at a constant value of 14.1 at almost all times that the vehicle 300 (FIG. 3) is running Periodically, the system reads and integrates the MAF sensor data to derive the total air flowing through the engine during an arbitrary period of time. If the air mass is measured in grams, then the calculated amount of fuel will also be in grams. Using an average density of gasoline of 6.17 pounds per gallon and knowing that there are 454 grams per pound, leads to dividing the total fuel mass in grams by (4.54*6.17). This yields the total number of gallons of fuel burned for a given amount of air as measure by the MAF sensor. Therefore, fuel consumed can be estimated from the integrated MAF sensor data using the following formula:

(gallons of fuel)=(grams of air)/(air/fuel ratio)/6.17/454

This embodiment uses the density of fuel for a gasoline-powered vehicle. A similar fuel consumption calculation can be made for a diesel-powered vehicle where the gasoline constants change to diesel constants.

What is claimed is:

1. A method of estimating a jurisdictional boundary crossing for fuel tax reporting relating to a commercial motor vehicle (CMV), the method comprising:
   defining a geo-fenced region for a jurisdiction using a telematics base unit having a processor, the geo-fenced region having at least one boundary;
   determining, using a position determination system, a location of the vehicle;
   determining whether the vehicle has crossed the boundary of the geo-fenced region based on the location of the vehicle and the at least one boundary of the geo-fenced region;
   estimating, using the telematics base unit, where the vehicle has crossed the boundary of the geo-fenced region when position determination system information is unavailable for a period of time, where the estimating includes
      determining if a distance between two consecutive position determination system points is greater than a threshold value;
      using predetermined route information to estimate where the vehicle has crossed the geo-fenced region boundary when the distance is greater than the threshold value; and
      storing vehicle location data on the telematics base unit until the telematics base unit is coupled to a portable device.

2. The method of claim 1, wherein determining a location of the vehicle includes generating position determination system information for a geo-fenced region boundary crossing using the telematics base unit.

3. The method of claim 1, wherein determining a location of the vehicle includes generating position determination system information for a geo-fenced region boundary crossing using the telematics base unit.

4. The method of claim 1, further comprising, sending vehicle location data to a fuel tax computing program using the portable device.

5. The method of claim 1, further comprising:
   using the location of the vehicle and the vehicle location data to compute fuel tax for the jurisdiction.

6. The method of claim 1, wherein the distance determining the distance between a last valid position determination system vehicle location before the telematics base unit stopped receiving position determination system information and a first valid position determination system vehicle location after the period of time when position determination system information was unavailable.

7. The method of claim 1, wherein the distance determining includes using odometer data.

8. The method of claim 1, further comprising:
   generating an event of a geo-fenced boundary crossing, using the telematics base unit, when the distance is greater than the threshold value.

9. The method of claim 8, wherein the generated event identifies both the previous vehicle location and the current vehicle location.

10. A system configured to determine state fuel tax reporting relating to a commercial motor vehicle (CMV), comprising:
    a telematics base unit installed on the vehicle;
    a portable device;
    at least one processor;
    at least one non-transitory computer storage medium comprising stored executable instructions that, when executed by the at least one processor, cause the at least one processor to perform the following operations to estimate a jurisdictional boundary crossing:
       defining a geo-fenced region for a jurisdiction using information from the telematics base unit, the geo-fenced region having at least one boundary;
       determining, using information from a position determination system, a location of the vehicle;
       determining whether the vehicle has crossed the boundary of the geo-fenced region using the location of the vehicle and the at least one boundary of the geo-fenced region;
       estimating, using information from the telematics base unit, a location of the vehicle when position determination system information is unavailable for a period of time, where the estimating includes
          determining if a distance between two consecutive position determination system points is greater than a threshold value;
          using predetermined route information to estimate where the vehicle has crossed the geo-fenced region boundary when the distance is greater than the threshold value; and
          storing vehicle location data on the telematics base unit until the telematics base unit is coupled to a portable device.

11. The system of claim 10, wherein the at least one non-transitory computer storage medium includes instructions that, when executed by the at least one processor, generate position determination system information related to a geo-fenced region boundary crossing.

12. The system of claim 10, wherein the at least one non-transitory computer storage medium includes instructions that, when executed by the at least one processor, generate position determination system information on the telematics base unit related to a geo-fenced region boundary crossing.

13. The system of claim 10, wherein the at least one non-transitory computer storage medium includes instructions that, when executed by the at least one processor, define a geo-fenced region for the jurisdiction on the telematics base unit.

14. The system of claim 10, wherein the at least one non-transitory computer storage medium includes instructions that, when executed by the at least one processor, send vehicle location data to a fuel tax computing program using the portable device.

15. The system of claim 10, wherein the at least one non-transitory computer storage medium includes instructions that, when executed by the at least one processor, use the vehicle location data to compute fuel tax for the jurisdiction.

16. The system of claim 10, wherein the distance determining instructions of the physical non-transitory computer storage medium include
    determining the distance between a last valid position determination system vehicle location before the telematics base unit stopped receiving position determination system information and a first valid position determination system vehicle location after the period of time when position determination system information was unavailable.

17. The system of claim 10, wherein the distance determining instructions include using odometer data.

18. The system of claim 10, wherein the operations of the at least one processor further comprise:
    generating an event of a geo-fenced boundary crossing when the distance is greater than the threshold value.

19. The system of claim 18, wherein the generated event identifies both the previous vehicle location and the current vehicle location.

20. At least one non-transitory computer storage medium comprising stored instructions which when executed determine state fuel tax reporting relating to a commercial motor vehicle (CMV), the at least one non-transitory storage medium comprising instructions which, when executed by a processor, perform the following operations:
    defining a geo-fenced region for a jurisdiction, the geo-fenced region having at least one boundary;
    determining, using a position determination system, a location of the vehicle;
    determining whether the vehicle has crossed the boundary of the geo-fenced region using the position determination system and the geo-fenced region;
    estimating where the vehicle has crossed the boundary of the geo-fenced region when position determination system information is unavailable for a period of time, where the estimating includes
        determining if a distance between two consecutive position determination system points is greater than a threshold value;
        using predetermined route information to estimate where the vehicle has crossed the geo-fenced region boundary when the distance is greater than the threshold value; and
        storing vehicle location data on a telematics base unit until the base unit is coupled to a portable device.

21. The storage medium of claim 20, wherein the at least one non-transitory computer storage medium includes instructions that, when executed by the at least one processor, generate position determination system information related to a geo-fenced region boundary crossing.

22. The storage medium of claim 20, wherein the at least one non-transitory computer storage medium includes instructions that, when executed by the at least one processor, generate position determination system information related to a geo-fenced region boundary crossing on the telematics base unit.

23. The storage medium of claim 20, wherein the at least one non-transitory computer storage medium includes instructions that, when executed by the at least one processor, define a geo-fenced region for the jurisdiction on the telematics base unit.

24. The storage medium of claim 20, wherein the at least one non-transitory computer storage medium includes instructions that, when executed by the at least one processor, send vehicle location data to a fuel tax computing program using the portable device.

25. The storage medium of claim 20, wherein the at least one non-transitory computer storage medium includes instructions that, when executed by the at least one processor, use the vehicle location data to compute fuel tax for the jurisdiction.

26. The storage medium of claim 20, wherein the at least one non-transitory computer storage medium includes instructions that, when executed by the at least one processor, record fuel purchase records.

27. The storage medium of claim 20, wherein the at least one non-transitory computer storage medium includes instructions that, when executed by the at least one processor, estimate the fuel consumed by the vehicle using data from a mass air-flow sensor.

28. The storage medium of claim 20, wherein the distance determining instructions include
    determining the distance between a last valid position determination system vehicle location before the telematics base unit stopped receiving position determination system information and a first valid position determination system vehicle location after the period of time when position determination system information was unavailable.

29. The storage medium of claim 20, wherein the distance determining instructions include using odometer data.

30. The storage medium of claim 20, wherein the operations of the at least one processor further comprise:
    generating an event of a geo-fenced boundary crossing when the distance is greater than the threshold value.

31. The storage medium of claim 30, wherein the generated event identifies both the previous vehicle location and the current vehicle location.

* * * * *